(12) United States Patent
Tänzler et al.

(10) Patent No.: US 7,641,932 B2
(45) Date of Patent: Jan. 5, 2010

(54) USE OF A PHOSPHATE MIXTURE FOR THE PRODUCTION OF CONCENTRATED SOLUTIONS AND BRINE FOR THE FOOD INDUSTRY

(75) Inventors: Richard Tänzler, Laudenbach (DE); Bernd Krug, Wettenberg (DE); Frank Neumann, Lampertheim (DE); Peter Braun, Heppenheim (DE); Ulrike Fischer-Nägele, Schwetzingen (DE)

(73) Assignee: B.K. Giulini GmbH, Ludwigshafen (DE)

( * ) Notice: Subject to any disclaimer, the term of this patent is extended or adjusted under 35 U.S.C. 154(b) by 585 days.

(21) Appl. No.: 11/254,740

(22) Filed: Oct. 21, 2005

(65) Prior Publication Data

US 2006/0121178 A1 Jun. 8, 2006

Related U.S. Application Data

(63) Continuation-in-part of application No. 10/499,682, filed on Apr. 24, 2006.

(30) Foreign Application Priority Data

Dec. 22, 2001 (DE) .................. 101 63 954
Dec. 4, 2002 (WO) .................. PCT/EP02/14272

(51) Int. Cl.
*A23L 1/237* (2006.01)
*A23L 1/304* (2006.01)

(52) U.S. Cl. .................. 426/648; 426/652; 23/296

(58) Field of Classification Search .................. None
See application file for complete search history.

(56) References Cited

U.S. PATENT DOCUMENTS 4,746,522 A * 5/1988 Wofford et al. .............. 426/243

4,867,958 A 9/1989 Peterson et al.
4,948,621 A * 8/1990 Schwartz .................. 426/652
6,929,705 B2 8/2005 Myers et al.

FOREIGN PATENT DOCUMENTS

| GB | 1 044 226 A | 9/1966 |
|---|---|---|
| WO | WO 98 07336 A | 2/1998 |
| WO | WO 99 00324 A | 1/1999 |
| WO | WO 01 00527 A | 1/2001 |
| WO | WO 01 24639 A | 4/2001 |

OTHER PUBLICATIONS

European Patent Office Official action and a translation, May 12, 2005.
A paper filed in the EPO, concerning inventor designation and a translation thereof, 2006.
The German Priority Document published on Sep. 4, 2003: DE 101 63 954 A1.
PCT of the instant U.S. application was published Jul. 10, 2003 and Sep. 4, 2003.
German Office Action of Sep. 2, 2002.
German Office Action of Sep. 2003.
J.R. Van Wazer, "Phosphorus and its Compounds", vol. I, p. 608 (1958).
CAMAL 2110, Buddenheim Co., International Search Report.

* cited by examiner

*Primary Examiner*—Jennifer McNeil
*Assistant Examiner*—Hong Mehta
(74) *Attorney, Agent, or Firm*—Venable LLP; Keith G. Haddaway

(57) ABSTRACT

Production of a phosphate mixture for brines used in the food industry, which comprises
a) 60 to 85 weight % of a clear soluble potassiumtripolyphosphate (KTPP) with a $P_2O_5$ content of 46.0 weight % to 47.0 weight % and a $K_2O/P_2O_5$ mole ratio of 1.7 to 1.78,
b) 15 to 39 weight % sodiumpolyphosphate,
c) 1 to 5 weigth % $M_xH_{3-x}PO_4$, with M=Na, K and x=1,2,3 and/or $M_xH_{4-x}P_2O_7$, in which M=Na and x=2,3,4 and when M=K then x=4;
wherein the phosphate mixture has a pH value of 8 to 10 and exhibits a turbidity in water and brines of <5 TE/F.

20 Claims, No Drawings

USE OF A PHOSPHATE MIXTURE FOR THE PRODUCTION OF CONCENTRATED SOLUTIONS AND BRINE FOR THE FOOD INDUSTRY

CROSS REFERENCE TO RELATED APPLICATIONS

This is a continuation-in-part of our copending application, U.S. Ser. No. 10/499,682 filed Jun. 22, 2004 (which is relied upon under 35 U.S.C. 120 and expressly incorporated by reference herein); said U.S. Ser. No. 10/499,682 being a National Stage application of PCT/EP02/14272, filed Dec. 14, 2002, and in turn claims foreign priority to German application 10163954.6-41 filed Dec. 22, 2001, each of which is relied upon under 35 U.S.C 119 and is expressly incorporated by reference herein.

FIELD OF THE INVENTION

The subject matter of the present invention is a novel phosphate mixture, characterized by its excellent solubility in water and aqueous solutions containing salt (brines).

The use of phosphate salts in the food industry has long been known. A great many special uses for phosphates in the food industry, for example their use for the processing of meat, fish, beverages and milk products, are described in the article "Phosphates in food" by Ricardo Molins, CRC Press, 1991, Publishing House Boca Raton, Ann Arbor. Phosphates represent so-called functional food additives. Their use depends on the area of application and is specifically directed toward diverse problem definitions.

Responsible for such a broad use spectrum of the phosphates are their properties, which include:

A buffering effect (for the pH adjustment as well as the pH stabilization);

The capacity to form complexes on multi-valent cations and thus indirectly connected the function as anti-oxidant (through bonding of pro-oxidative cations) and as anti-microbial substance, as well as for influencing the consistency;

The function as polyanion in an interaction with different protein fractions of individual food items;

The souring capability (for pH adjustment in beverages and as souring component in leavening agents).

The respective function depends on the structure and/or the degree of condensation, the pH value, as well as the cation of the salt.

The following chemical terms are used for the individual phosphates in this invention:

| | | |
|---|---|---|
| STPP | sodiumtripolyphosphate | $Na_5P_3O_{10}$ |
| KTPP | potassiumtripolyphosphate | $K_5P_3O_{10}$ |
| TKPP | tetrapotassiumpyrophosphate | $K_4P_2O_7$ |
| TSPP | tetrasodiumpyrophosphate | $Na_4P_2O_7$ |
| SPP | sodiumpolyphosphate | $Na_3PO_3$—$(NaPO_3)_x$—$Na_2PO_4$ |
| KPP | potassiumpolyphosphate | $K_3PO_3$—$(KPO_3)_x$—$K_2PO_4$ |
| MSP | monosodiumphosphate | $NaH_2PO_4$ |
| DSP | disodiumphosphate | $Na_2HPO_4$ |
| TSMP | trisodiummonophosphate | $Na_3PO_4$ |
| MKP | monopotassiumphosphate | $KH_2PO_4$ |
| DKP | dipotassiumphosphate | $K_2HPO_4$ |
| DSPP | disodiumdiphosphate | $Na_2H_2P_2O_7$ |

(last formula is mentioned in table 2)

According to the present invention, KTPP, TKPP, SPP and MSP and/or MKP are preferably used as phosphate salts.

In addition to the direct admixture of phosphates in the food industry, in the form of a dry substance (powdered form), liquid forms are used as well in a number of application cases, so-called phosphate solutions or phosphate brines. This is the case in the area of meat processing (e.g. the production of pickled items for cooking), as well as for treating seafood products (fish filet, crustaceans, types of mollusks, etc.). Phosphates for brine applications must have the following critical properties to be used effectively and with high functionality:

1) They must have a pH value (in aqueous solution) of 8 to 10.
2) They must be highly water soluble.
3) They must have high solubility in salt-containing solutions (brines).
4) The prepared solutions must be clear and free of residues, meaning there should be no precipitations and no excess solutes.
5) As functional component of the food item with additive, it should contain a certain share of sodium and/or potassium diphosphates and/or triphosphates.

A person skilled in the art of the food industry understands brines to be solutions in which high concentrations of cooking salt (NaCl) are dissolved up to the point of saturation. Some commercially available phosphates and phosphate mixtures for the meat and fish industry meet some, but not all, of the individual properties that are required them.

Thus, it is the object of the present invention to find a phosphate mixture that meets all of the above-stated requirements.

The new phosphate mixture is characterized in that it comprises the following components:

1.) 60 to 85 weight % of a clear soluble potassiumtripolyphosphate with a $P_2O_5$ content of 46.0 weight % to 47.0 weight %, preferably 46.4-46.8 weight % and in particular 46.4 weight %, as well as a $K_2O/P_2O_{10}$ mol ratio of 1.74 to 1.78, preferably 1.73 to 1.75, and in particular 1.74.

2.) 15 to 39, preferably 14-39, weight % sodiumpolyphosphate SPP

3.) 1 to 5 weight % of $M_xH_{3-x}PO_4$, with M=Na, K and x=1,2,3 and/or $M_xH_{4-x}P_2O_7$, in which M=Na and x=2,3,4, when M=K, then x=4, wherein the mixture exhibits a pH value (in water) of 8 to 10, preferably 8.5 to 9.5, and exhibits turbidity in water and brines of <5TE/F.

Turbidity is measured with standard measuring devices for this technical field, e.g. with the turbidity photometer NEPHLA, by the Lange company [of Dusseldorf and Berlin]; it employs the DIN EN 27027/ISO 7027 measuring method, (DIN EN referring to German edition of European standards; and the acronymDIN referring to the Deutsches Institut fur Normung, the German Institute for Standardization, at a wave length of 860 nm; measuring range of 0.001-1000FNU; units of measurement being FNU (or optionally TE/F, EBC, mg/lSiO₂)

Essential to the invention is the use of a so-called clear soluble potassium tripolyphosphate (KTPP) having a $P_2O_5$ content of 46.0 to 47.0 weight %, preferably 46.4 to 46.8 and especially preferred 46.4%, which consists stoichiometrically of a mixture of KTPP and tetrapotassiumpyrophosphate at a ratio of approximately 3:1. The product is produced by mixing corresponding amounts of potassiumphosphates, in particular tripotassiumphosphate, with phosphoric acid (expressed as $P_2O_5$) and by heating the mixture, in a rotary furnace, or kiln to the condensation temperature and keeping it at this temperature until the reaction balance is adjusted or until an equilibrium is reached. An equilibrium is reached when the product: reactant ratio remains constant with additional reaction time. A mixture is thus formed, containing only small amounts of orthophosphates and diphosphates in addition to KTPP and tetrapotassiumpyrophosphate as well as the harder to dissolve potassiummetaphosphates, which is responsible for the cloudiness of the polyphosphate solution outside of this narrow range; see phase diagram by J. R. van Wazer, "Phosphorous and its compounds," Vol. VI, page 608, Interscience Publishers Inc., New York.

Specifically, the product is a blend of potassium tripolyphosphate (KTPP), tetrapotassium pyrophosphate (TKPP), and a minor amount of the product contaminants potassiummonophosphate and potassiumpolyphosphate. Primarily, the product drawn from the kiln comprises potassiumtripolyphosphate (KTPP) and tetrapotassiumpyrophosphate (TKPP) at a 3:1 ratio. Small amounts of potassiumphosphate (less than 1%) and potassiumpolyphosphate (less than 0.1%) are contained as secondary products.

In Tables 1 and 2, the recipe components for producing the mixture according to the invention are listed, taking into account that the desired pH value of the mixture according to the invention can be adjusted with the aid of Na/K orthophosphates (Table 1), as well as with Na/K diphosphates (Table 2).

TABLE 1

Example for producing the mixture according to the invention by using Na/K orthophosphates for the pH value adjustment.

| | min. weight % | max. weight % | typical weight % |
|---|---|---|---|
| orthophosphate ($M_xH_{3-x}PO_4$) x = 1, 2, 3 M = Na, K | 1% | 5% | 1-2% |
| clear soluble KTPP (potassiumtripolyphosphate) | 60% | 85% | 70% |
| sodiumpolyphosphate with $P_2O_5$ content of 60-71.5% | 15% | 39% | 28-29% |
| $P_2O_5$ content | 47 | 55 | 50 |
| pH value | 8 | 10 | 9 |
| clouding (6% solution) | | | <5 TE/F |

TABLE 2

Example for producing the mixture according to the invention by using Na/K diphosphates for the pH value adjustment.

| | min. weight % | max. weight % | typical weight % |
|---|---|---|---|
| diphosphates ($M_xH_{4-x}P_2O_7$) M = Na and x = [4, 3, 2] and/or M = K and x = 4 | 1% | 5% | 0-2% |
| clear soluble KTPP (potassiumtripolyphosphate) | 60% | 85% | 70% |
| sodiumpolyphosphate with $P_2O_5$ content of 60-71.5% | 15% | 39% | 28-29% |
| $P_2O_5$ content | 47 | 55 | 50 |
| pH value | 8 | 10 | 9 |
| clouding (6% solution) | | | <5 TE/F |

The main components (sodiumpolyphosphate and potassiumtripolyphosphate) of the mixture according to the invention by themselves show a high solubility limit in water (>50%) (see Table 3).

TABLE 3

Solubility limit (in g phosphate mixture per 100 g solution) of the mixture according to the invention as compared to phosphate mixtures based on the prior art:

| Type of phosphate | g phosphate/100 g solution [% m/m] |
|---|---|
| mixture according to the invention | 50 |
| potassiumtripolyphosphate (KTPP) | 64 very cloudy! |
| clear soluble KTPP | >50 |
| sodiumtripolyphosphate (STPP) | 14 |
| tetrapotassiumpyrophosphate (TKPP) | 65 |
| STPP/TSPP - 90:10 blend | 17 |
| STPP/polyphosphate 80:20 blend | 16 |
| sodiumpolyphosphate | >50 |

Furthermore, individual main components of the mixture according to the invention have good solubility properties even in brines (see Table 4; Example 1). The phosphate types and/or phosphate combinations known so far exhibit individual properties of the aforementioned required properties, but not all of them:

Thus, the KTPP mentioned in Table 3 is highly soluble (64 g/100 g solution) and also soluble in the presence of cooking salt, but is cloudy.

The sodiumpolyphosphates mentioned in Tables 3 and 4 are also highly soluble, but lack the functional shares of diphosphates and triphosphates listed under requirement 5. By producing a mixture comprising both main components of the mixture according to the invention and an additional phosphate for the pH adjustment (orthophosphate or di-phosphate), synergic effects may be increased in the solubility in highly concentrated brines.

The synergistic effect of the mixture according to the invention and its effect on the solubility in salt-containing solutions are demonstrated with the aid of 3 examples shown in Table 4.

Example 1 and Example 2 show a traditional sequence for the solubility, meaning the phosphate type and/or the phosphate combination is dissolved as the first component in water. Following this, the respective amount of sodium chloride (cooking salt) is dissolved.

In the food industry, e.g. for producing cooked ham, it is standard procedure to first dissolve the phosphate in water and then add the cooking salt. The so-called inverse preparation technique is understood to mean that the cooking salt solution (brine) is first produced and the phosphate is then added.

Example 3 additionally shows the synergistic effect of the mixture according to the invention. With this mixture, an "inverse sequence" can be used for the solution, meaning the phosphate is stirred into a salt solution and is soluble—a property that phosphates or phosphate combinations known so far do not have.

Table 4: Synergistic effect of the mixture according to the invention on the solubility and stability in salt-containing solutions (brines).

EXAMPLE 1

Solubility in Salt-Containing Aqueous Solutions (Brines)

The amount of 5 g phosphate (phosphate mixture) is dissolved by stirring it into 75 g water and the amount of 20 g cooking salt is then added. The brine is analyzed to determine whether it is stable over a longer period of time (16 h), meaning no precipitation (excess solute) occurs.

|  | Analysis of brine stability of different phosphates/phosphate blends in the system with 5% phosphate, 20% NaCl and 75% water |
|---|---|
| phosphate mixture according to the invention | + |
| pentapotassiumtriphosphate (KTPP) | +*) |
| pentasodiumtriphosphate (STPP) | − |
| tetrapotassiumdiphosphate (TKPP) | − |
| STPP/TSPP - 90:10 blend | − |
| sodiumpolyphosphate | + |

Evaluation:
+ = stable brine
− = precipitations/excess solutes occur
*)Following the preparation, a cloudy solution results with low precipitation (excess solute) after 16 hours.

EXAMPLE 2

Solubility in Salt-Containing Aqueous Solutions (Brines) in a Traditional Sequence The amount of 8 g phosphate (phosphate mixture) is dissolved by stirring it into 68 g water. Subsequently, the amount of 24 g cooking salt is added and the brine is then analyzed over a longer period of time (16 h) to determine whether it is stable, meaning no precipitations (excess solutes) occur.

|  | Analysis of the brine stability of various phosphates/phosphate blends in the system containing 8% phosphate, 24% NaCl, 68% water |
|---|---|
| phosphate mixture according to the invention | + |
| pentapotassiumtriphosphate (KTPP) | − (no stable brine after 16 h) |
| Clear soluble KTPP | − (no stable brine after 16 h) |
| (STPP) | − (not soluble in brines) |
| tetrapotassiumdiphosphate (TKPP) | − (not soluble in brines) |
| pentasodiumtriphosphate (STPP) | − (not soluble in brines) |
| tetrasodiumdiphosphate (TSPP) 90:10 blend |  |
| sodiumpolyphosphate | − (no stable brine after 16 h) |

Analysis:
+ = stable brine
− = precipitations/excess solutes occur

EXAMPLE 3

Solubility and Stability of Phosphates in Salt-Containing Aqueous Solutions (Brines) for Inverse Preparation of the Brine The amount of 22 g of cooking salt is dissolved by stirring it into 72.5 g water. Subsequently, the amount of 5.5 g phosphate (phosphate mixture) is stirred in. The brine is then analyzed over a longer period of time (16 h) to determine whether it is stable, meaning that no precipitations (excess solutes) occur.

|  | Analysis of brine stability of different phosphates/phosphate blends in the inverse system containing 22% NaCl, 72.5% water, 5.5% phosphate |
|---|---|
| phosphate mixture according to the invention | + |
| pentapotassiumtriphosphate (KTPP) | +*) |
| Clear soluble KTPP | − |
| pentasodiumtriphosphate (STPP) | − |
| tetrapotassiumdiphosphate (TKPP) | − |
| STPP/TSPP - 90:10 blend | − |
| sodiumpolyphosphate ($P_2O_5 = 60\%$) | − |
| sodiumpolyphosphate ($P_2O_5 = 68\%$) | + |

Evaluation:
+ = stable brine
− = precipitations/excess solutes occur
*)Following preparation, a cloudy solution is obtained with slight precipitations (excess solutes) after 16 h.

What is claimed is:

1. A phosphate salt mixture for use in the manufacture of a food grade brine for the food industry comprising:
   a) 60 to 85 weight % of a clear soluble potassiumtripolyphosphate (KTPP) with a P2O5 content of 46.0 weight % to 47.0 weight % and a $K_2O/P_2O_5$ mole ratio of 1.7 to 1.78,
   b) 14 to 39 weight-% sodiumpolyphosphate, with 60-71.5 weight-% $P_2O_5$
   c) 1 to 5 weight % of $M_xH_{3-x}PO_4$, with M=Na, K and x=1,2,3 and/or $M_xH_{4-x}P_2O_7$, in which M=Na, and x=2, 3,4 and when M=K then x=4;
   wherein the phosphate mixture exhibits, in water, a pH value of 8 to 10 and exhibits a turbidity, in water and brines, of <5 TE/F.

2. The phosphate mixture of claim 1, wherein product a) is the condensation product of KOH and phosphoric acid.

3. The phosphate mixture of claim 1, wherein the phosphate mixture exhibits, in water, a pH value of 8.5 to 9.5.

4. A method for forming a salt brine for use in pickling food goods, comprising providing a solution of sodium chloride and adding the product of claim 1.

5. A pickled/preserved food, comprising a food and the product of claim 1.

6. The food of claim 5 which is a ham.

7. The phosphate mixture of claim 1, comprising 15 to 39 weight % sodiumpolyphoshate, with 60-71.5 weight-% $P_2O_5$.

8. A solution comprising the phosphate mixture of claim 1.

9. The solution of claim 8, further comprising sodium chloride.

10. A method for producing a phosphate salt mixture for food grade brine, comprising 60 to 85 weight % of a clear soluble potassiumtripolyphosphate (KTPP) with a $P_2O_5$ content of 46.0 weight % to 47.0 weight %, and a $K_2O/P_2O_5$ mole ratio of 1.7 to 1.78; 15 to 39 weight % sodiumpolyphosphate and 1 to 5 weight % of $M_xH_{3-x}PO_4$, with M=Na, K and x=1,2,3 and/or $M_xH_{4-x}P_2O_7$, in which M=Na and x=2,3,4 and when M=K then x=4;
   wherein the method comprises mixing at least one potassiumphosphate salt or potassiumoxide and $P_2O_5$ to establish a ratio of potassium : phosphorus and to form a reaction mixture
   heating the mixture to a temperature at which condensation of the reactant mixture occurs; recovering a product mixture; finely grinding solid product; and mixing solid product with ground powders of sodium polyphosphate, $M_xH_{3-x}PO_4$, with M=Na, K and x=1, 2,3 and/or $M_xH_{4-x}P_2O_7$, in which M=Na, and x=2,3,4 and when M=K then x=4.

11. The method of claim 10, which further comprises maintaining the reactant mixture at said temperature until said product mixture is an equilibrium mixture.

12. The method of claim 10, wherein the clear soluble potassiumtripolyphosphate (KTPP) has a $P_2O_5$ content of 46.4-46.8 weight %.

13. The method of claim 10, wherein the clear soluble potassiumtripolyphosphate (KTPP) has a $P_2O_5$ content of 46.4 weight %.

14. The method of claim 10, wherein the $K_2O/P_2O_5$ mole ratio is 1.73 to 1.75.

15. The method of claim 10, wherein the $K_2O/P_2O_5$ mole ratio is 1.74.

16. The method of claim 10, comprising heating tripotassiumphosphate and $P_2O_5$ to form a condensation product.

17. The method of claim 10, wherein the product mixture comprises KTPP with the contaminants potassium monophosphate and potassium polyphosphate.

18. The method of claim 17, which further comprises dissolving the product mixture in water to form a clear solution with a pH of 8 to 10.

19. The method of claim 17, which further comprises dissolving the product mixture in water or brine to form a solution, which exhibits a turbidity of less than 5 TE/F.

20. The method of claim 10, wherein the ratio of potassium:phosphorus is 1.7 to 1.78.

* * * * *

UNITED STATES PATENT AND TRADEMARK OFFICE
CERTIFICATE OF CORRECTION

| | | |
|---|---|---|
| PATENT NO. | : 7,641,932 B2 | Page 1 of 1 |
| APPLICATION NO. | : 11/254740 | |
| DATED | : January 5, 2010 | |
| INVENTOR(S) | : Richard Tanzler | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1071 days.

Signed and Sealed this

Eighteenth Day of January, 2011

David J. Kappos
*Director of the United States Patent and Trademark Office*